US005801370A

United States Patent [19]
Katoh et al.

[11] Patent Number: 5,801,370
[45] Date of Patent: *Sep. 1, 1998

[54] MULTI-DIRECTIONAL BAR CODE READING DEVICE

[75] Inventors: Hiroaki Katoh, Sagamihara; Toshimasa Miyazaki, Yamato, both of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 701,065

[22] Filed: Aug. 21, 1996

Related U.S. Application Data

[63] Continuation of Ser. No. 446,297, May 22, 1995, abandoned, which is a continuation of Ser. No. 206,260, Mar. 7, 1994, abandoned, which is a continuation of Ser. No. 950,130, Sep. 24, 1992, abandoned, which is a continuation of Ser. No. 662,118, Feb. 28, 1991, Pat. No. 5,206,491.

[30] Foreign Application Priority Data

Mar. 2, 1990 [JP] Japan ......................... 2-51992
Mar. 8, 1990 [JP] Japan ......................... 2-56952

[51] Int. Cl.$^6$ .................................................. G06K 7/10
[52] U.S. Cl. ............................................. 235/467; 235/462
[58] Field of Search .............................. 235/465, 467, 235/462; 359/197, 216; 250/236, 578.1

[56] References Cited

U.S. PATENT DOCUMENTS

| | | | |
|---|---|---|---|
| 3,225,177 | 12/1965 | Stites et al. | 235/467 |
| 3,622,758 | 11/1971 | Schanne | 235/462 |
| 3,728,677 | 4/1973 | Munson | 235/437 |
| 3,812,325 | 5/1974 | Schmidt | 235/467 X |
| 3,818,444 | 6/1974 | Connell | 235/467 |
| 3,916,158 | 10/1975 | Sansone et al. | 235/467 |
| 3,947,816 | 3/1976 | Rabedeau | 235/467 |
| 3,958,104 | 5/1976 | Zuckerman | 235/467 X |
| 4,224,509 | 9/1980 | Cheng | 235/467 X |
| 4,587,407 | 5/1986 | Ahmed et al. | 235/465 |
| 4,652,732 | 3/1987 | Nickl | 235/462 |
| 4,681,394 | 7/1987 | Noguchi | 359/206 |
| 4,795,224 | 1/1989 | Goto | 235/467 X |
| 4,935,609 | 6/1990 | Wike, Jr. | 235/472 |
| 4,971,410 | 11/1990 | Wike, Jr. | 359/17 |
| 4,982,205 | 1/1991 | Hasegawa | 346/108 |
| 5,000,529 | 3/1991 | Katoh et al. | 235/467 |
| 5,019,694 | 5/1991 | Collins, Jr. | 235/383 |
| 5,028,103 | 7/1991 | Fukasawa | 359/206 |
| 5,042,619 | 8/1991 | Kohno | 235/440 X |
| 5,073,702 | 12/1991 | Schuhmacher | 235/467 |
| 5,206,491 | 4/1993 | Katoh et al. | 235/467 |
| 5,268,565 | 12/1993 | Katoh | 235/467 |
| 5,293,033 | 3/1994 | Yamashita | 235/462 |

FOREIGN PATENT DOCUMENTS

| | | | |
|---|---|---|---|
| 0040973 | 12/1981 | European Pat. Off. | |
| 0 273 554 | 7/1988 | European Pat. Off. | |
| 2757235 | 7/1979 | Germany | |
| 3609669 | 10/1986 | Germany | |
| 60-238811 | 11/1985 | Japan | 250/236 |
| 61-238811 | 10/1986 | Japan | 235/465 |
| H1-228075 | 9/1989 | Japan | |
| 2-053194 | 2/1990 | Japan | 235/465 |
| 7713933 | 6/1979 | Netherlands | |

Primary Examiner—Donald T. Hajec
Assistant Examiner—Karl Frech
Attorney, Agent, or Firm—Staas & Halsey

[57] ABSTRACT

A multi-directional bar code reading device for reading an object that is to be read by projecting scanning beams from many directions, includes a plurality of mirrors (2) arranged around a beam scanning unit (1) and a plurality of beam sources (3) for emitting beams toward the beam scanning unit (1). The beam scanning unit (1) is irradiated with beams generated from the plurality of beam sources (3), scanning beams are reflected by the plurality of mirrors (2) and are projected from a plurality of directions onto an object (5) to be read, and light reflected from the object (5) is detected in order to read bar codes on the object (5) to be read.

27 Claims, 16 Drawing Sheets

Fig. 11A
Fig. 11B
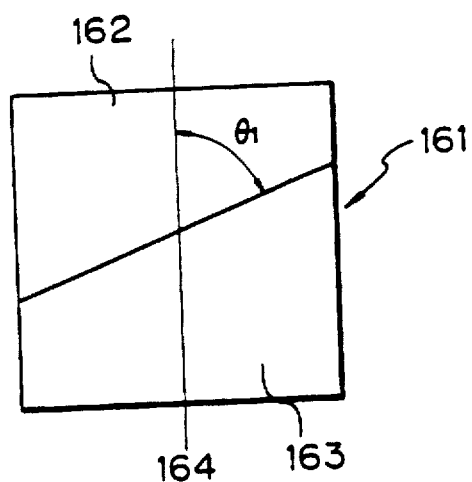
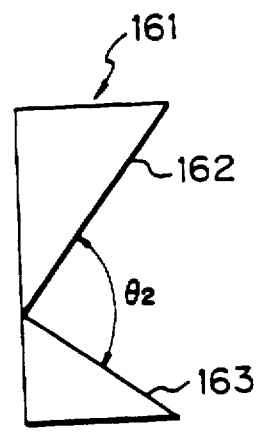

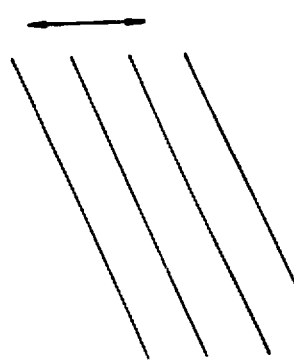
Fig. 12C — WHEN θ₁ AND θ₂ CHANGES
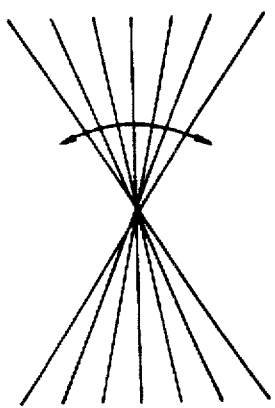
Fig. 12B — WHEN θ₁ CHANGES
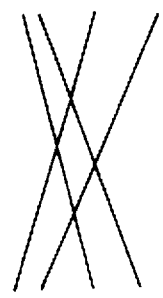
Fig. 12A — WHEN θ₂ CHANGES

MULTI-DIRECTIONAL BAR CODE READING DEVICE

CROSS REFERENCE TO RELATED APPLICATION

This application is related to U.S. application Ser. No. 07/598,427, filed Oct. 16, 1990.

This application is a continuation of application Ser. No. 08/446,297, filed May 22, 1995, now abandoned, which is a continuation of application Ser. No. 08/206,260, filed Mar. 7, 1994, now abandoned, which is a continuation of application Ser. No. 07/950,130, filed Sep. 24, 1992, now abandoned, which is a continuation of U.S. application Ser. No. 07/662,118, filed Feb. 18, 1991, now U.S. Pat. No. 5,206,491.

BACKGROUND OF THE INVENTION

The present invention relates to a multi-directional bar code reading device for reading a bar code on an object that is to be read by projecting scanning beams from many directions.

A POS system (point-of-sales data management system) has been used in department stores and in supermarkets in order to enhance efficiency in the management of goods and in the check-out operation. It is desired that the goods and products labelled with bar codes be efficiently read out irrespective of the positions where they are placed.

In general, the problem of expediting material handling in a manner to minimize the need for human intervention still exists. Numerous systems have been developed to achieve this end. Some of these systems require a hand held reader for special labels which are placed on the articles. In other systems, great care must be taken to insure that the articles pass through a detection zone with their labels properly positioned and oriented with respect to a reader.

In data acquisition systems developed for retail point-of-sale applications, the typical way in which data entry is effected requires that a clerk read sales data from a ticket associated with each item of merchandise and then manually enter this data into the system using a keyboard. Therefore, a hand-held reader has been developed for scanning machine readable optical and magnetic codes applied to tickets pursuant to entering the sales data into the system. As is apparent, the automatic entry of sales data encoded in machine readable form can be effected more rapidly and accurately than manual entry via a keyboard.

The ultimate approach to the problem of data entry in this area appears to be the use of a fixed scanner for reading from a distance machine readable, optically encoded data from a ticket attached to each item. This approach frees the clerk from the task of having to manipulate a reader and also considerably eases the problems of variations in scanning rate inherent in hand scanning.

According to a fixed type scanner that has heretofore been used in supermarkets and similar stores, the directions in which the scanning beams are projected are limited to just straight up from one surface or upward tilted directions. Therefore, an operator must carry out a cumbersome operation in which he makes sure the position or surface where the bar codes are attached to the goods, directs the device toward the reading direction and executes the reading operation. Moreover, even when the bar codes attached to the articles on a production line are to be automatically read out, the articles have to be so arranged in advance that the positions or surfaces where the bar codes are labelled are oriented in a predetermined direction, causing such problems as the facility of handling bulky objects and difficulty involved in arranging products having dissimilar sizes on the same line.

From the above discussion of a fixed type bar code reading device, it is necessary to provide an appropriate optical scanner device including the following:

1. A beam scanning unit; a plurality of reflecting mirrors arranged around the beam scanning unit; and a plurality of beam sources for emitting beams toward the beam scanning unit.
2. In item 1, the beams are controlled so as to be emitted from only one of the plurality of beam sources.
3. In the beam scanning unit of the item 1, both beam reflecting surfaces and beam non-reflecting surfaces are mounted on a scanning mirror to always emit only one scanning beam in the beam scanning unit.

With regard to the above item 3, a prior art U.S. Pat. No. 3,818,444 (Filed Jun. 29, 1972), was disclosed on Jun. 18, 1974, by Richard A. Connell (assignee: Pitney-Bowes, Inc.), entitled "Optical Bar Code Reading Method and Apparatus Having an X Scan Pattern".

4. In an optical scanning unit, a plurality of optical systems are exclusively controlled to always emit a scanning beam from only one optical system selectively.

This method includes: effecting scanning processes from a plurality of directions to select a beam from only one optical source by means of an operation of mirrors, selecting a beam mechanically by mirrors, and so forth.

SUMMARY OF THE INVENTION

The object of the present invention is to easily read bar codes without being affected by the position at which they are attached to an object that is to be read, by irradiating a beam scanning unit, e.g., a polygonal mirror, with beams emitted from a plurality of beam sources, and reflecting the formed scanning beams using a plurality of mirrors so that the beams are projected from a plurality of directions onto the object to be read.

A beam scanning unit scans the beams that are emitted in order to form the scanning beams. Mirrors are arranged to surround the beam scanning unit and reflect the scanning beams so that they are projected onto an object that is to be read. Beam sources generate the beams.

In accordance with the present invention, there is provided a multi-directional reading device for reading an object that is to be read by projecting scanning beams from many directions, including: a plurality of mirrors arranged around a beam scanning unit and a plurality of beam sources for emitting beams toward the beam scanning unit, wherein the scanning unit is irradiated with beams generated from the plurality of beam sources, scanning beams reflected in a scanning mode are reflected by the plurality of mirrors and are projected from a plurality of directions onto an object to be read, and light returned after being reflected is detected in order to read bar codes on the object to be read, and the beam is exclusively emitted from only one of the plurality of beam sources.

Therefore, bar codes are easily read out without being affected by the position at which they are attached to the object to be read, by irradiating a beam scanning unit with beams emitted from a plurality of beam sources, and reflecting the formed scanning beams using a plurality of mirrors so that they are projected from a plurality of directions onto the object that is to be read.

BRIEF DESCRIPTION OF THE DRAWINGS

FIGS. 6A, 6B and 6C are drawings showing other embodiments of optical scanning device in accordance with the present invention, wherein FIG. 6A and FIG. 6B are a perspective view and a cross-sectional view, respectively, of the multi-directional optical scanning device for bar code reading, having a specified beam scanning unit, and wherein FIG. 6C is a perspective view showing still another embodiment having a single beam source and a multi-beam generation mechanism, provided with a spectroscope and lens system, in accordance with the present invention;

FIGS. 11A and 11B illustrate each front view of the reflecting portion in FIG. 10; and FIGS. 12A, 12B and 12C illustrate multifarious patterns which the laser beam scans when θ2 changes, when θ1 changes and when θ1 and θ2 change.

As FIG. 13 is a sectional view showing an embodiment using a rotary polygon mirror having two or more reflecting surfaces in accordance with the present invention.

DESCRIPTION OF THE PREFERRED EMBODIMENTS

With reference to the prior art drawings, the present invention will be described in detail by clarifying the differences between the present invention and the prior art.

Figure 1:
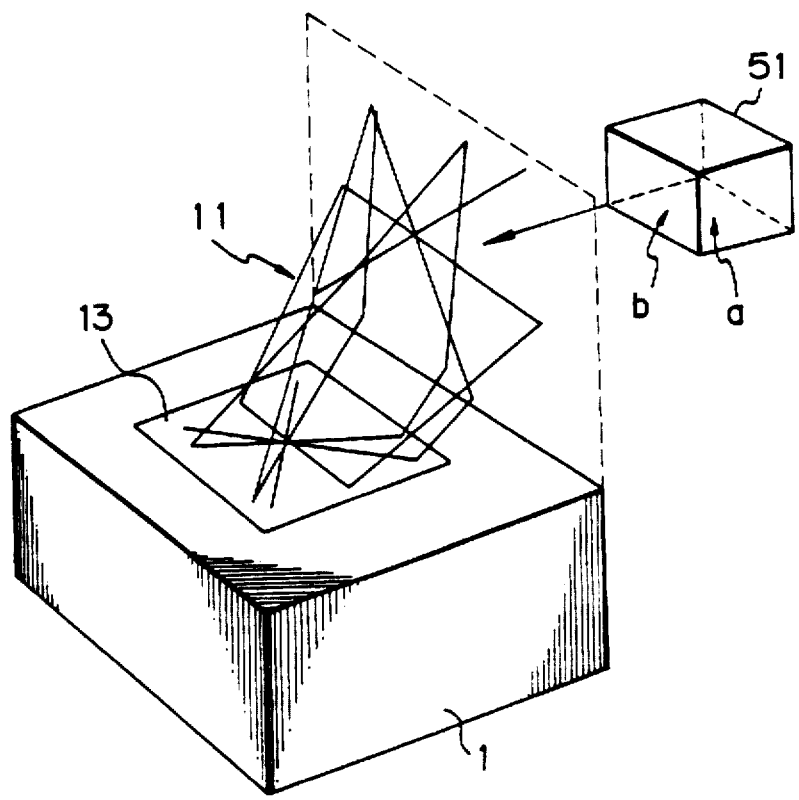
FIG. 1 is a perspective view showing a prior art fixed type scanner.

FIG. 1 is a perspective view showing a prior art fixed type scanner. Reference numeral 1 denotes a scanner, 11 scanning beams, 13 a window, and 51 an object or a product. The direction in which the scanning beams are projected is limited to just straight up from one surface or upper tilted directions. An operator must carry out cumbersome operations in which he makes sure the position or surface where the bar codes are attached to the goods, directs the device toward the reading direction and effects the reading operation. Moreover, even when the bar codes attached to the articles on a production line are to be automatically read out, the object has to be so arranged in advance that the positions or surfaces where the bar codes are labelled are oriented in a predetermined direction.

Figure 2A:
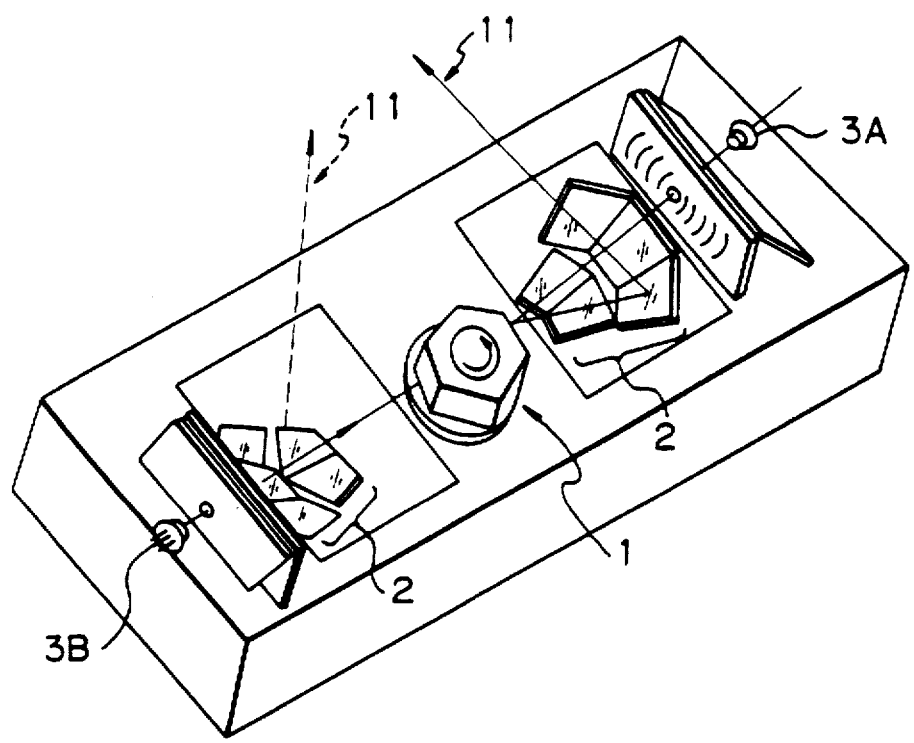
FIG. 2A is a perspective view and FIG. 2B is a cross-sectional view showing, respectively, the constitution of an embodiment in accordance with the present invention.
Figure 2B:
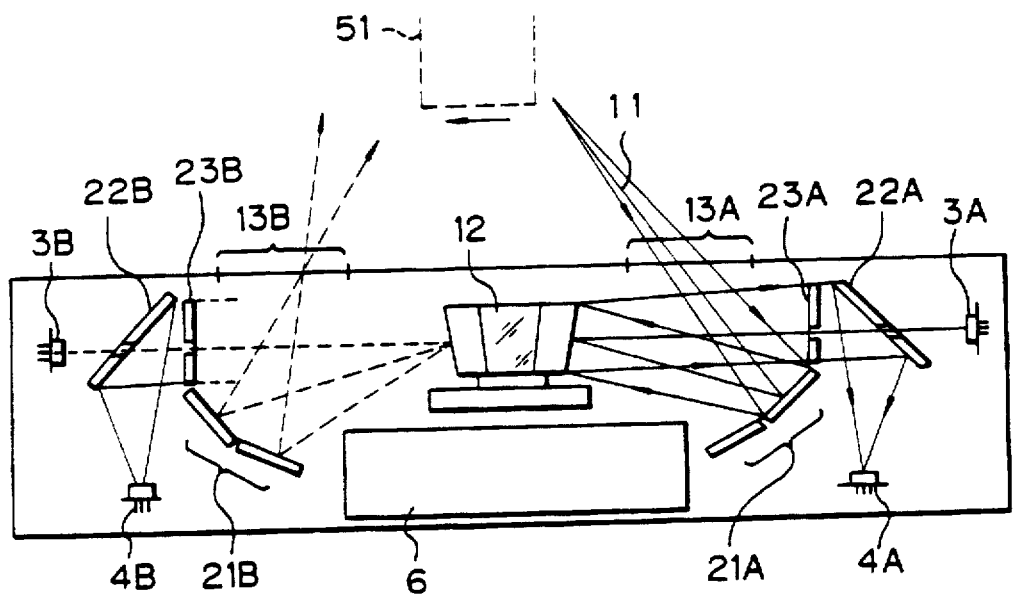

FIG. 2(A) is a perspective view and FIG. 2(B) a cross-sectional view showing the constitution of an embodiment of the present invention.

Referring to FIGS. 2(A) and 2(B), the beam scanning unit 1 scans the beams that are emitted to form the scanning beams and is comprised, in this case, of a polygonal mirror, for example, a polyhedral mirror that is rotatable.

Mirrors 2 are arranged around the beam scanning unit 1 and constitute a plurality of pattern mirrors. The scanning beams 11 reflected by the mirrors 21A, 21B are projected through windows 13A, B onto the object 51 that is to be read. Here, the mirrors 21 are provided in a number corresponding to the number of beam sources 3 such that the scanning beams 11 are projected through the respective windows 13 onto the object 51 to be read.

The beam sources 3 (3A, 3B) generate beams and serve as laser beam sources.

The light-receiving elements 4 (4A, 4B) receive light reflected from the object 51 to be read and convert it into an electric signal.

The object 51 to be read is goods or a product to which bar codes are attached so as to be read.

A control unit 6 rotates the beam scanning unit 1 in order to form the scanning beams and further works to exclusively turn on the plurality of beam sources 3.

Next, described below is the operation of the constitution of FIGS. 2(A), 2(B) which consist of two sets of beam sources 3, mirrors 2, 21 and 22, lenses 23 and light-receiving elements 4 for one beam scanning unit 1.

The beams generated from the two beam sources 3 are permitted to fall on one beam scanning unit 1 from opposite directions.

The beam scanning unit 1 rotates and scans the beams emitted from the two beam sources 3A, 3B to form the scanning beams 11. The thus formed scanning beams 11 are reflected by the mirrors 21A, 21B and are projected through windows 13A and 13B and from different directions onto the object 51 that is to be read. Therefore, the object 51 to be read is widely scanned from just underneath and from both sides thereof by a plurality of scanning beams 11 that are successively projected in different directions from the plurality of mirrors through the window 13A and 13B by a plurality of scanning beams 11 that are successively projected in different directions from the plurality of mirrors through the window 13B, and whereby the bar codes attached thereto can be scanned over a wide range.

The light reflected from the object 51 to be read is detected by the light-receiving elements 4 through mirrors 21, beam scanning unit 1, focusing lenses 23A and 23B, and reflectors 22A and 22B. Bar codes attached to the object 51 to be read are then read. In this case, the control unit 6 controls the rotation of the beam scanning unit 1 and further works to exclusively turn on only one of the beam sources 3 at a time, so that the scanning beams will not produce noise which will be mixed into the other light-receiving element 4.

Due to the above-mentioned operation and due to the provision of two sets of beam sources 3, mirrors 21 and, 22, lenses 23 and light-receiving elements 4 for one beam scanning unit 1, the scanning beams are projected from different directions onto the object 51 to be read, and it is possible to easily read the bar codes by the scanning over a wide range irrespective of the position of the object 51 to be read.

Described below with reference to FIG. 2A and 2B is the constitution according to another embodiment of the case when the scanning beams are projected onto the goods (object 51 to be read) from nearly right-angle directions.

Figure 3B:
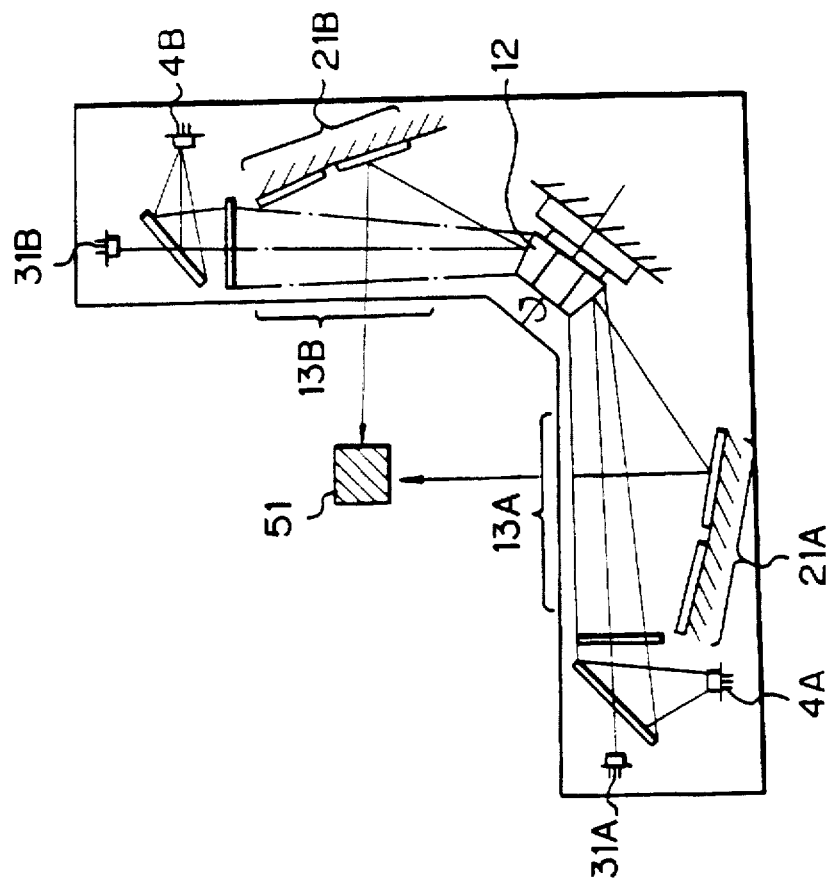
FIG. 3A is a perspective view where the windows are nearly at right angles to each other and FIG. 3B is a sectional view of the multi-directional bar code reading device shown in FIG. 3A.
Figure 3A:
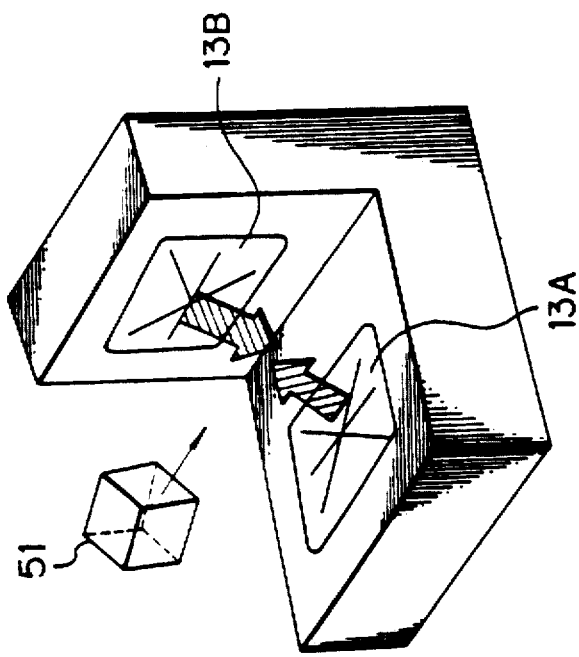

FIG. 3(A) is a perspective view where the windows 13A and 13B are nearly at right angles to each other, and the scanning beams are projected onto the goods 51 through the windows 13A and 13B in order to read bar codes attached to the goods 51.

FIG. 3(B) is a sectional view of the multi-directional reading device shown in the perspective view of FIG. 3(A).

In FIG. 3(B), two sets of laser beam sources 31A and 31B, pattern mirrors 21, windows 13A and 13B, and light-receiving elements 4 are provided at nearly right-angle directions for one polygonal mirror 12. Due to this constitution, the scanning beams are projected onto the goods 51 through the windows 13A and 13B at positions nearly at right angles to each other, and the returned light after reflection is detected by the light-receiving elements 4 in order to read the bar codes. Therefore, the scanning is effected over a wide range such as from under and from the sides of the goods 51 to easily read the bar codes. During the scanning, the laser beam source 31A or the laser beam source 31B is controlled to be turned on exclusively.

Figure 4B:
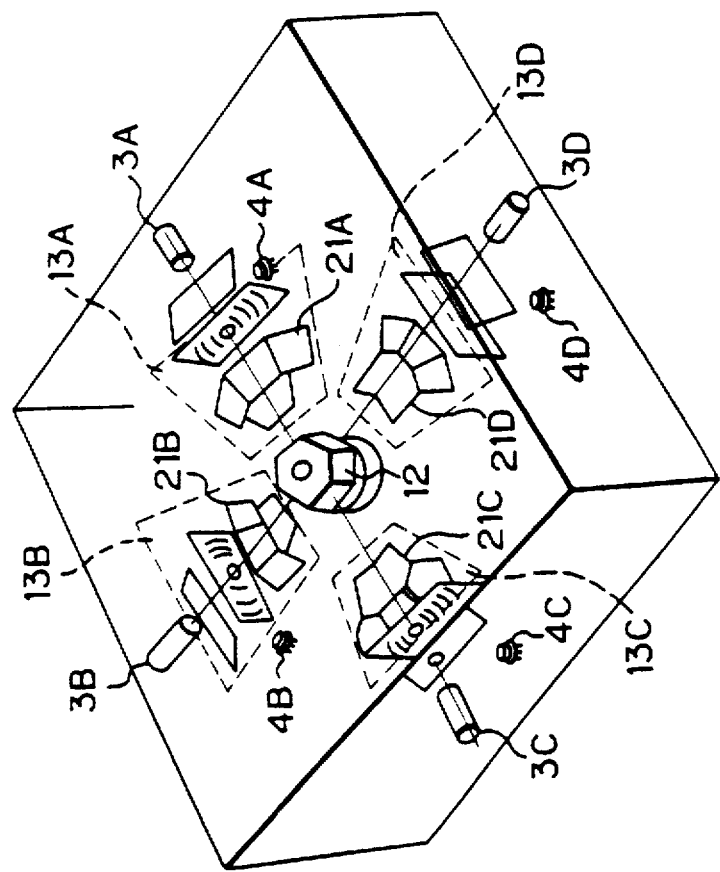
FIG. 4B is a sectional view of the device shown in FIG. 4A.
Figure 4A:
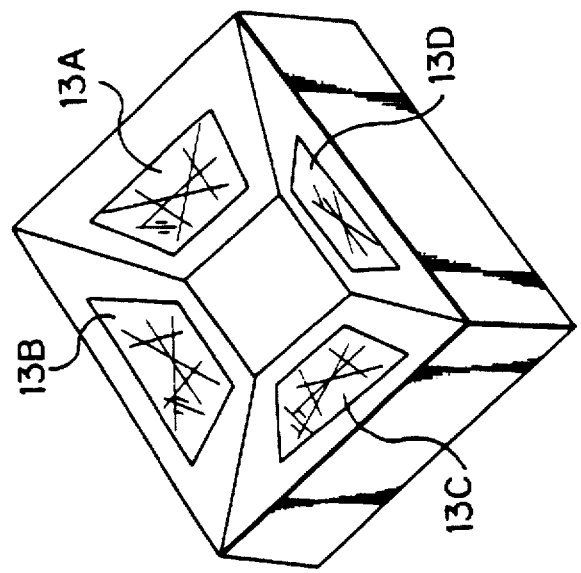
FIG. 4A is a perspective view of another embodiment of the multi-directional reading device in which four windows are provided symmetrically on a plane with the polygonal mirror at the center.

FIG. 4A and 4B show a constitution in which four sets of laser beam sources 3A to 3D, pattern mirrors 21A to 21D, windows 13A to 13D and light-receiving elements 4 are arranged on a plane with one polygonal mirror 12 at the center.

FIG. 4(A) is a perspective view of the multi-directional reading device in which four windows 13A to 13D are provided symmetrically on a plane with the polygonal mirror 12 at the center.

FIG. 4(B) is a sectional view of the multi-directional reading device shown in the perspective view of FIG. 4(A).

In FIG. 4(B), four sets of laser beam sources 3A to 3D, pattern mirrors 21A to 21D, windows 13A to 13D, and light-receiving elements 4A to 4D are provided symmetrically on a plane with one polygonal mirror 12. Due to this constitution, the scanning beams are projected onto the goods through the windows 13A to 13D, i.e., from the four directions, and the returned light after being reflected is detected by the light-receiving elements 4 in order to read bar codes. Therefore, the scanning is effected over a wide range from four directions under the goods 51 to easily read the bar codes. During the scanning, the four laser beam sources 3A to 3D are controlled so that only one is turned on at a time.

Figure 5A:
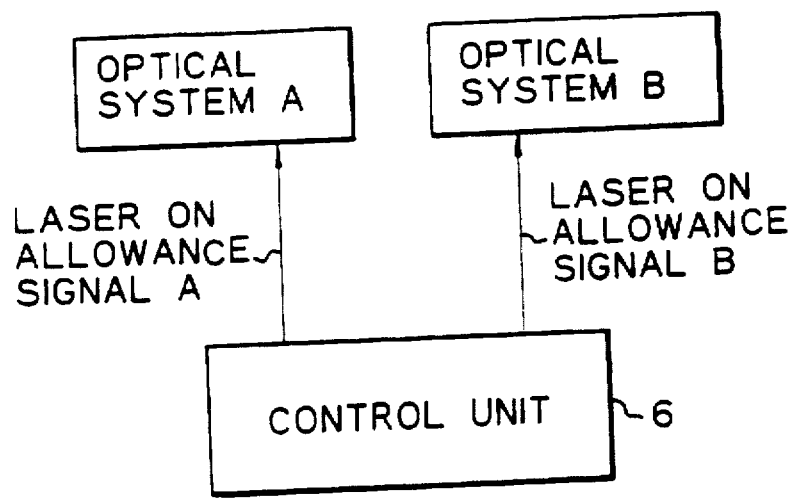
FIG. 5A is a block diagram illustrating how the beam source is turned on according to the present invention.
Figure 5B:
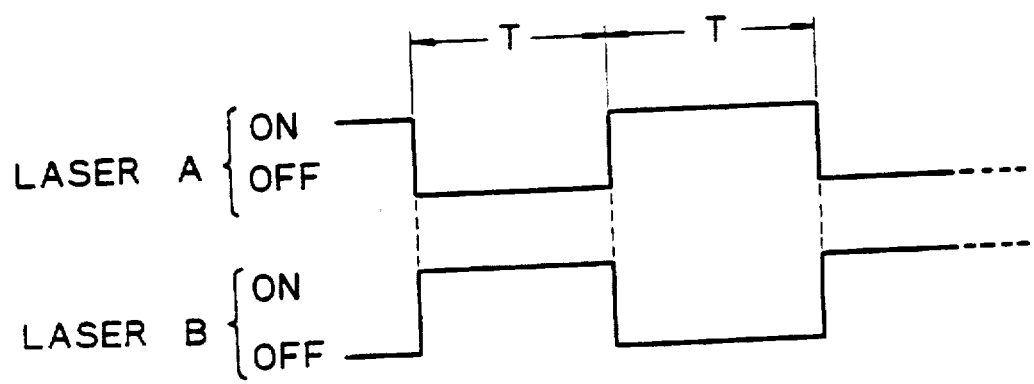
FIG. 5B is a diagram of the process of turning on the laser beam source.

FIGS. 5A and 5B form a diagram illustrating how the beam source is turned on according to the present invention.

In FIG. 5(A), the control unit 6 is the one shown in FIG. 1 which works to scan the beam scanning unit (polygonal mirror) 1 and to exclusively turn on only one of the plurality of beam sources (laser beam sources) 3.

FIG. 5(B) shows a diagram of the process of turning on the laser beam source. This turn-on chart is for the case where there are two sets of laser beam sources 3A, 3B, or 31A, 31B that are shown in FIGS. 3A, 3B, 4A and 4B. Here, symbol T represents a time in which the beam source is turned on/turned off (ON/OFF). Two sets of laser beam sources are alternatingly turned on after every time T, and the reflected light is detected by the light-receiving elements to read the bar codes, while eliminating the noise (interference) caused by the other scanning beam. Even when two or more sets of laser beam sources are used, the operation is similarly controlled to exclusively turn on only one of the laser beam sources in turn.

According to the present invention as described above, the scanning beams formed by one beam scanning unit (e.g., polygonal mirror) which is irradiated with beams emitted from a plurality of beam sources, are reflected by a plurality of mirrors and are projected from a plurality of directions onto the object to be read. Therefore, the bar codes can be easily read without being affected by the position at which they are attached to the object to be read. In particular, since only one beam scanning unit (e.g., polygonal mirror) is generally used, it is possible to realize the device with a simple structure, a small size, and at a reduced cost. Moreover, since the goods and products can be read out irrespective of the positions at which the bar codes are attached thereto, the burden on the operator is reduced, and management of products can be carried out automatically and easily in a manufacturing plant or the like based upon the bar codes.

A further embodiment in accordance with the present invention will now be described with reference to FIGS. 6(A), 6(B) and FIGS. 7(A), 7(B).

Figure 6A:
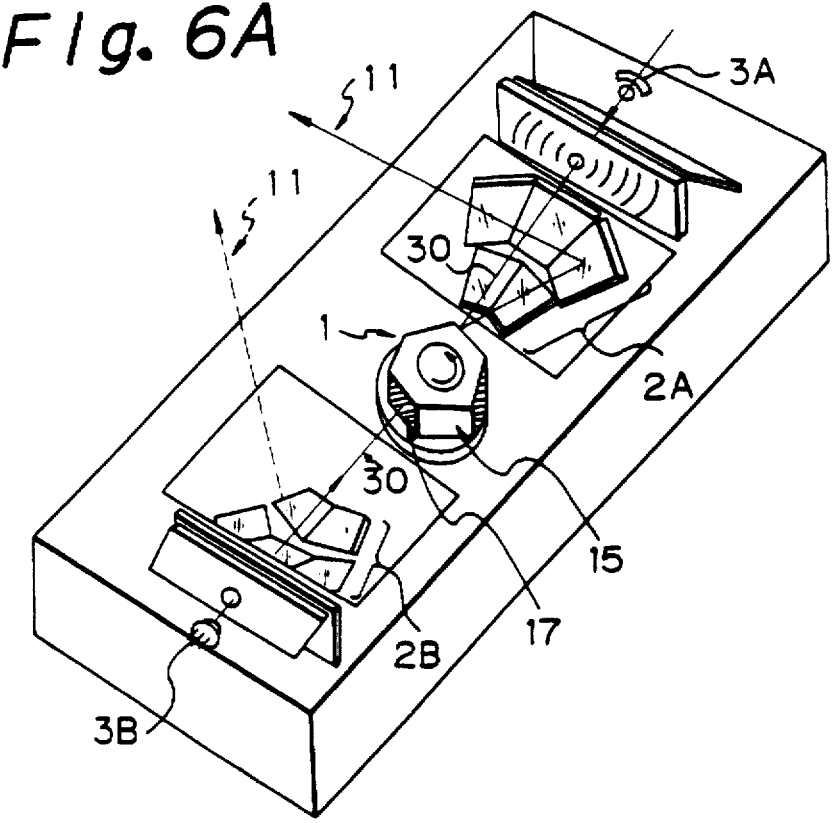
Figure 6B:
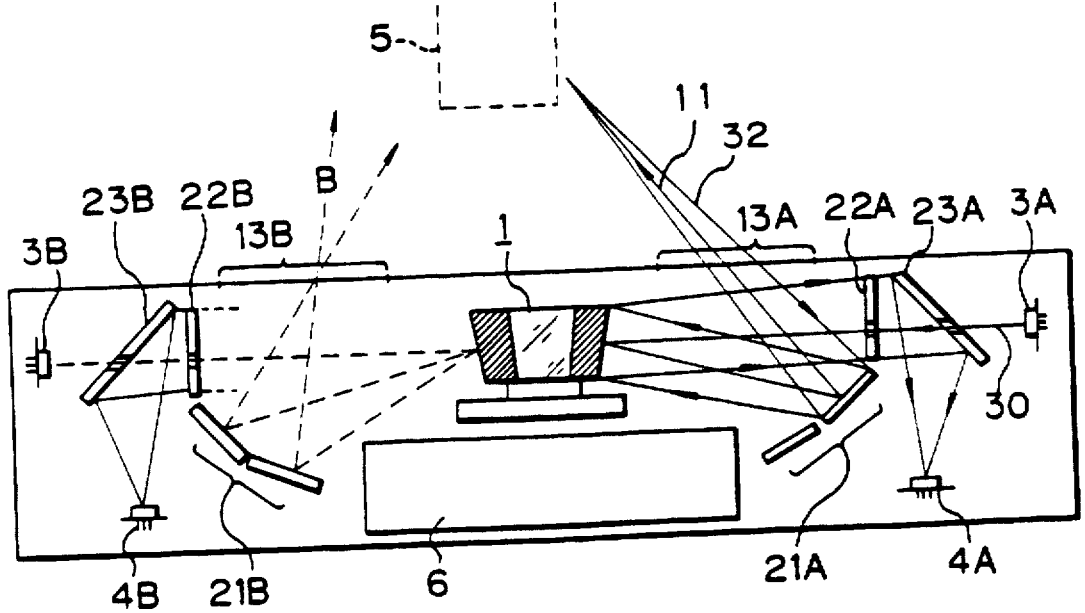

In FIGS. 6(A) and 6(B), an optical scanning device has the same constitution as that in FIGS. 2(A) and 2(B), except for a beam scanning unit 1. The beam scanning unit 1 has beam reflection surfaces 15 and beam non-reflection surfaces 17 both of which are rotatable around an axis in order to form a scanning beam 11 by reflecting the beam 30 by scanning unit 1 and mirrors 21, to produce only one of the beams 30 emitted from beam sources 3A, 3B. Mirrors 2 are provided to correspond to the beam sources 3 such that a scanning beam 11 formed by the beam scanning unit 1 is reflected by the mirrors and is projected onto the object 5 to be read.

It is therefore made possible to easily read bar codes irrespective of the position at which they are attached to the objects 5 to be read while eliminating the effects of interfering light such as other scanning beams. It is also possible to provide reading apparatus having a simple constitution in which a beam scanning unit 1 is provided with beam reflecting surfaces 15 and beam non-reflecting surfaces 17, and only one scanning beam 11 is formed at all times from a plurality of beams and is projected onto the object 5 that is to be read.

The constitution and operation of an embodiment of the present invention will now be described in detail in conjunction with FIGS. 6(A) and 6(B).

Referring to FIGS. 6(A) and 6(B), the beam scanning unit 1 scans the beams that are emitted to form a scanning beam 11 and is comprised, in this case, of a polygonal mirror (a polyhedral mirror that is rotatable). The beam scanning unit 1 has beam reflecting surfaces 15 and beam non-reflecting surfaces 17, and forms a scanning beam 11 by reflecting, in a scanning mode, only one beam at all times from among the beams emitted from the plurality of beam sources 3.

Mirrors are arranged around the beam scanning unit 1 and constitute a plurality of pattern mirrors 21. The scanning beams 11 are reflected by the set of mirrors and are projected through windows 13 onto the object 5 that is to be read. Here, the number of mirrors corresponds to the number of beam sources 3 such that a scanning beam 11 is projected at all times through each of the windows 13 onto the object 5 to be read.

The beam sources 3 generate beams 30 and serve as laser beam sources.

The light-receiving elements 4 receive light reflected from the object 5 to be read and convert it into an electrical signal.

The object 5 to be read is, for example, goods or a product to which bar codes are attached to be read out.

A control unit 6 rotates the beam scanning unit 1 in order to form the scanning beam 11.

Figure 6C:
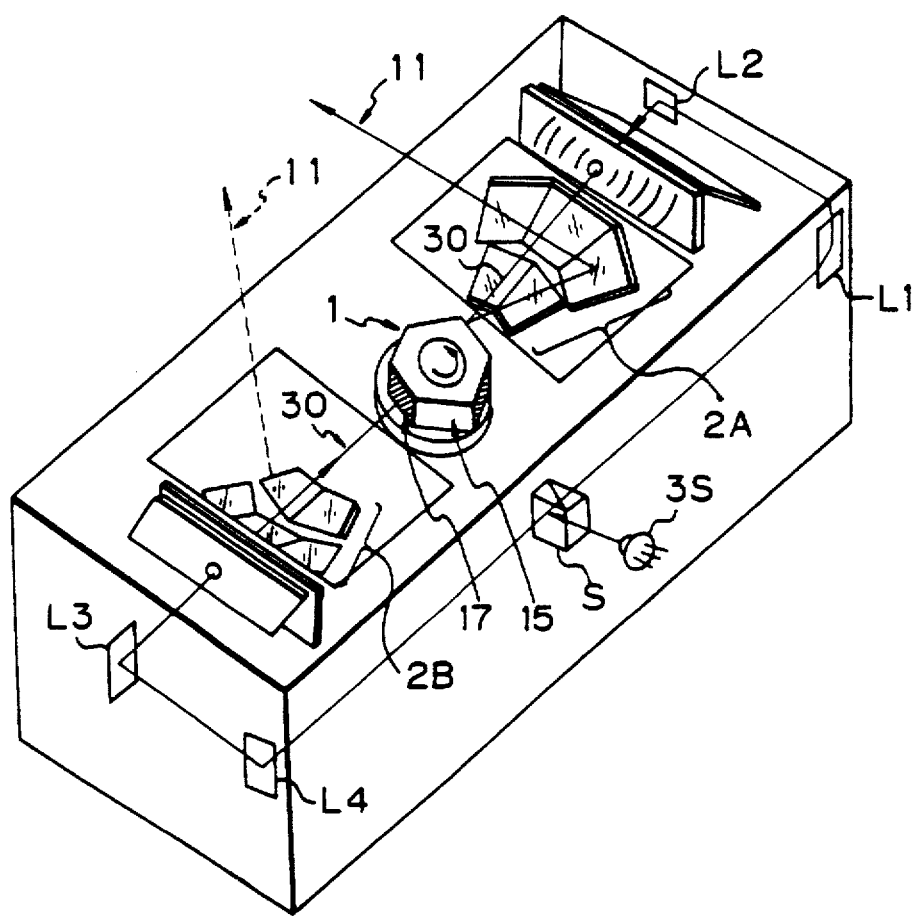

Referring to FIG. 6(C), another embodiment is shown in which an optical system in conjunction with a light source 3S, a spectroscope S and mirrors L1 ... L4 is used to emit light beams from a plurality of directions.

Figure 7A:
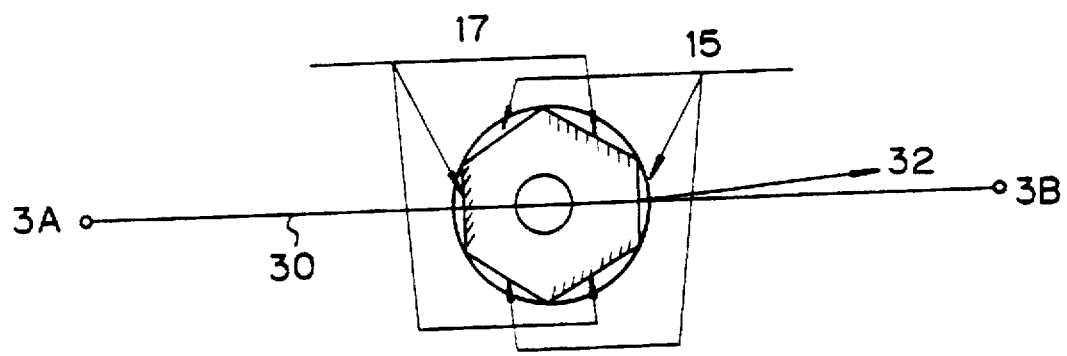
FIG. 7A and FIG. 7B are a top view and a perspective view of an embodiment of a specified beam scanning unit having beam reflecting surfaces and beam non-reflecting surfaces in accordance with the present invention.
Figure 7B:
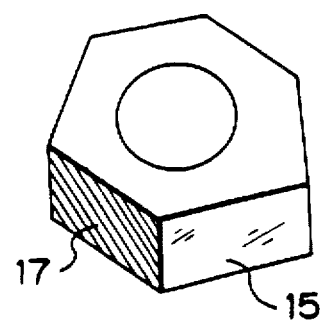

The beam scanning unit 1 will now be described in detail in conjunction with FIGS. 7(A) and 7(B). As shown in the perspective view of FIG. 7(B), the beam scanning unit 1 is constituted by beam reflecting surfaces 15 that reflect, in a scanning mode, a beam emitted from the beam sources, and a beam non-reflecting surfaces 17 which do not reflect the incident beam emitted from the beam sources (or which reflects the beams in a direction other than the directions of mirrors 2 so as not to become a source of noise). The beam reflecting surfaces 15 and the beam non-reflecting surfaces 17 are alternately provided, for example, as shown in FIG. 7(A), so that light beams from the beam source 3A and the beam source 3B are alternately reflected thereby to form a scanning beam 31.

Next, described below is the operation of the constitution of FIGS. 7A and 7B wherein the beam scanning unit 1 has six surfaces, i.e., three beam reflecting surfaces 15 and three beam non-reflecting surfaces 17, and further has two sets of beam sources 3, mirrors, and light-receiving elements 4.

(1) The beams generated from the two beam sources 3 are permitted to fall on the beam scanning unit 1 from opposite directions.

(2) The beam scanning unit 1 rotates and scans the beams 30 emitted from the two beam sources 3A, 3B to form a first alternating scanning beam. The reflected scanning beam is reflected by the mirrors and is projected onto the object to be read through the windows in different alternating directions. Therefore, the object to be read is scanned from underneath and from both sides by the second scanning beam 32 that is projected in different directions from the plurality of mirrors via the windows, so the bar code attached thereto can be easily scanned.

(3) The light reflected from the object to be read is detected by either the light-receiving element, via mirrors, beam scanning unit, focusing lenses, and reflectors. A bar code attached to the object to be read is then converted to electrical signals.

By the above-mentioned operation and the provision of the beam scanning unit 1 having beam reflecting surfaces 15 and beam non-reflecting surfaces 17, as well as two sets of beam sources, mirrors, and light-receiving elements, only one scanning beam is always projected from different directions onto the object to be read, so that a bar code can be easily read irrespective of the position of the object to be read. Moreover, it is possible to eliminate the effect of interference caused by other scanning beams by using a device having a simple constitution.

Even when there are two or more beam sources, only one scanning beam at a time is reflected by the beam scanning unit 1 and then projected onto the object to be read to thereby eliminate the negative effects caused interference from other light. Of the beam reflecting surfaces and the beam non-reflecting surfaces of the beam scanning unit, the beam non-reflecting surfaces are so designed as to not reflect the beam. Here, however, the beam non-reflecting surfaces may be so designed as to reflect the beam in a direction that does not meet the mirrors, so that the beam is not projected onto the object to be read, and so that the beam is not mixed into the optical system to hinder the reading of a bar code.

According to the present invention as described in the foregoing embodiments, the beam scanning unit is provided with beam reflecting surfaces and beam non-reflecting surfaces, and only one beam is formed at all times from the beams emitted from the plurality of beam sources, and that beam is projected onto the object to be read. Therefore, the bar codes can be easily read irrespective of the position at which they are attached to the object to be read, while eliminating the effects of light interference caused by other scanning beams at the time of reading, using an apparatus having a simple constitution.

Another embodiment in accordance with the present invention will now be described with reference to FIGS. 8 to 14.

In a conventional multi-directional bar code reading device, a large number of components are needed.

These components are as follows:

a rotatable polygon mirror, a reflecting mirror of the rotatable polygon mirror, a holographic disc, and reflecting portions formed of a plurality of reflecting mirrors.

These many components make the cost high and miniaturization difficult. Also, an increase in a beam pattern length leads to an increase in the size of a reflecting mirror.

Figure 8:
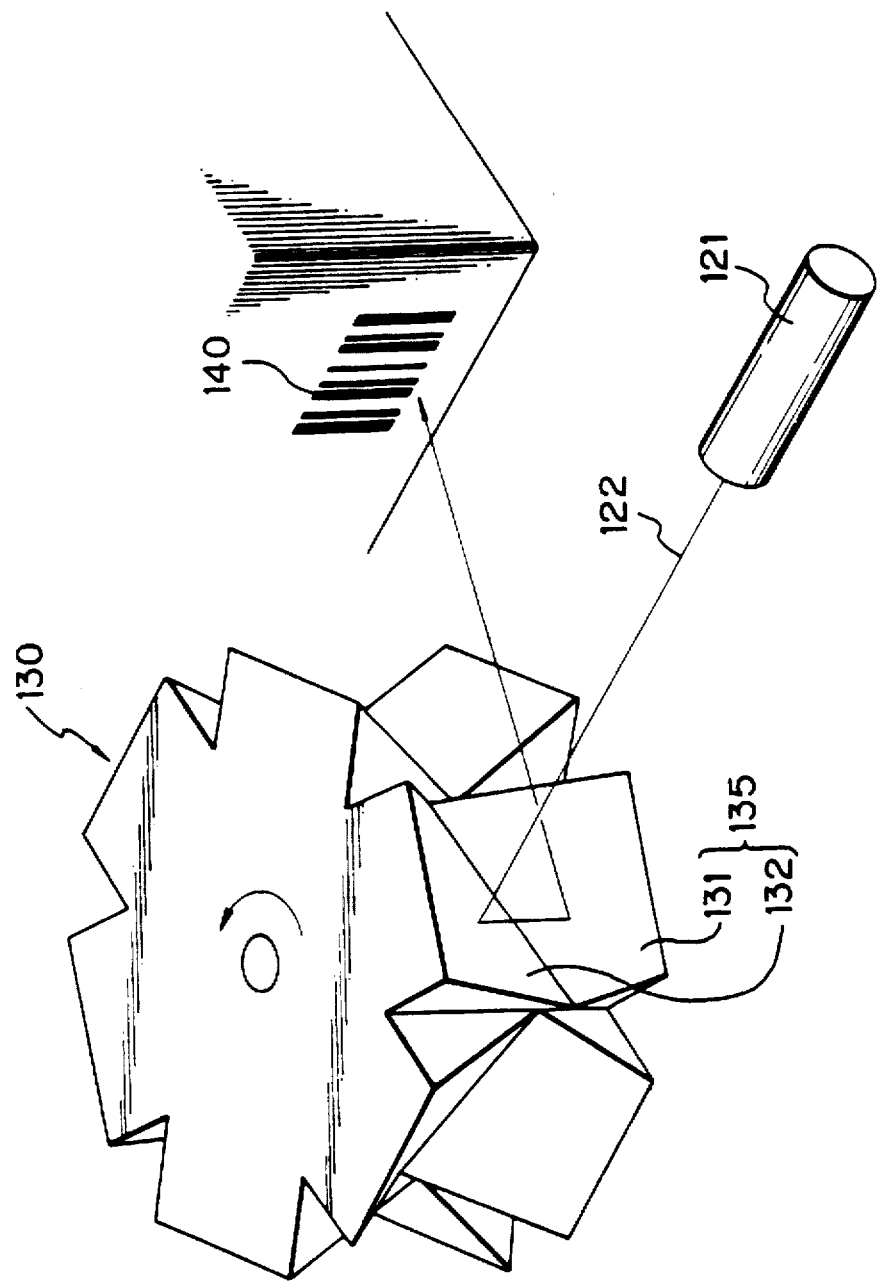
FIG. 8 is a perspective view showing a rotary polygon mirror and the operation thereof as another embodiment.

FIG. 8 is a perspective view of an embodiment of the present invention. In FIG. 8, reference numeral 121 denotes a light source emitting a light beam 122, and 130 a rotary polygonal mirror having a plurality of reflection portions 135 for reflecting the light beam 122 from the light source 121 onto a bar code 140. The number of reflecting planes 131, 132, ... is not limited to only two.

The light beam 122 is reflected from a first reflecting plane 131 of the reflecting portion 135 and then reflected from a second reflecting plane 132 to scan the bar code 140. Since at least two reflecting planes 131 and 132 are provided in each face of each reflecting portion 135 to obtain a multi-directional scanning pattern, multi-directional scanning beams are scanned on to the bar code in accordance with the rotation of the rotary polygonal mirror 130.

Figure 9:
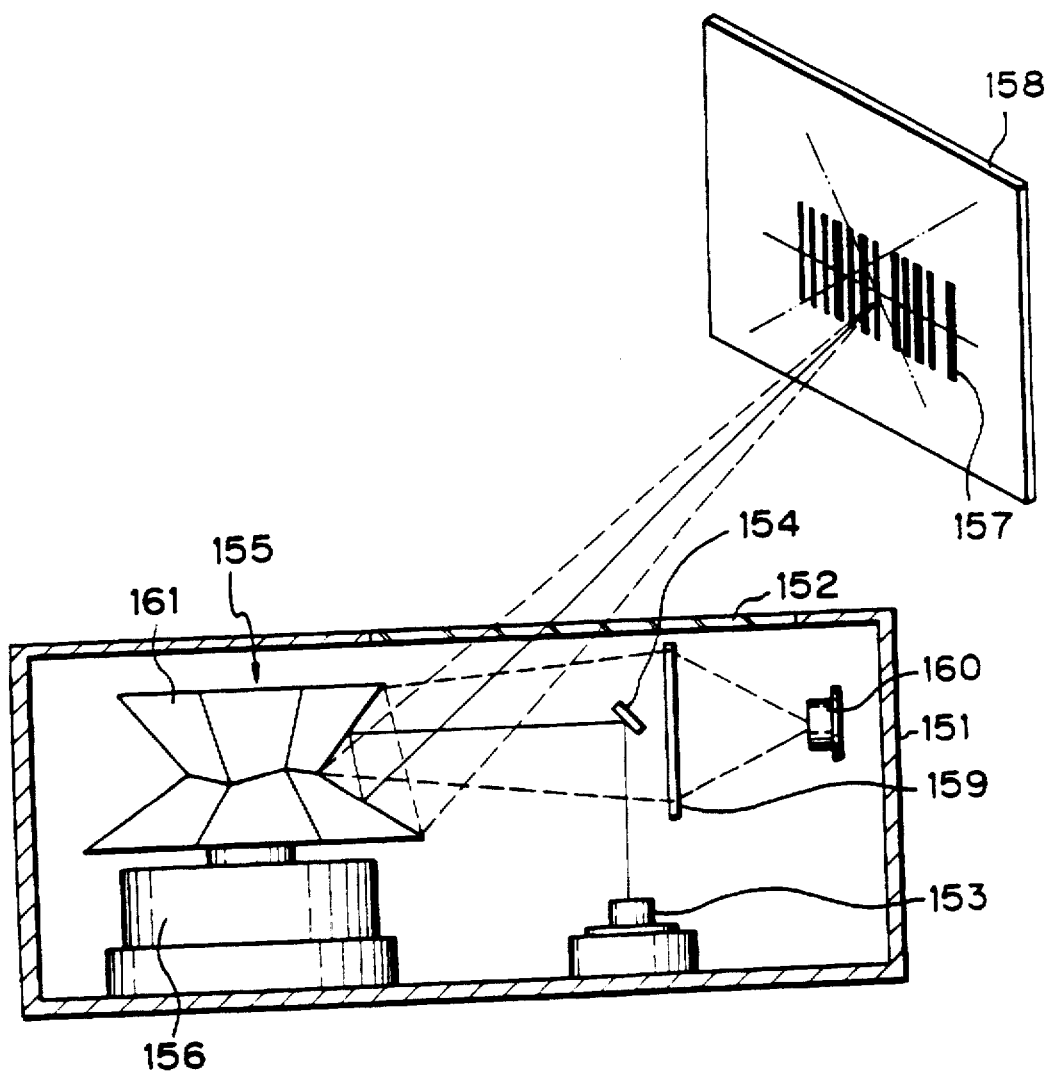
FIG. 9 is a cross-sectional view of an optical scanning device using the polygon mirror in FIG. 8 of an embodiment in accordance with the present invention.

FIG. 9 is a cross-sectional view of an optical scanning device of an embodiment in accordance with the present invention. In FIG. 9 reference numeral 151 denotes a casing of the device, 152 a reading window mounted on the top of the casing 151, 153 a light source emitting a laser beam, 154 a small mirror for changing a transmission direction of the laser beam, 155 a rotary polygonal mirror, 157 a bar code attached to an article 158, 159 a condenser lens for collecting laser beams, and 160 a photodetector for detecting collected laser beams.

Figure 10:
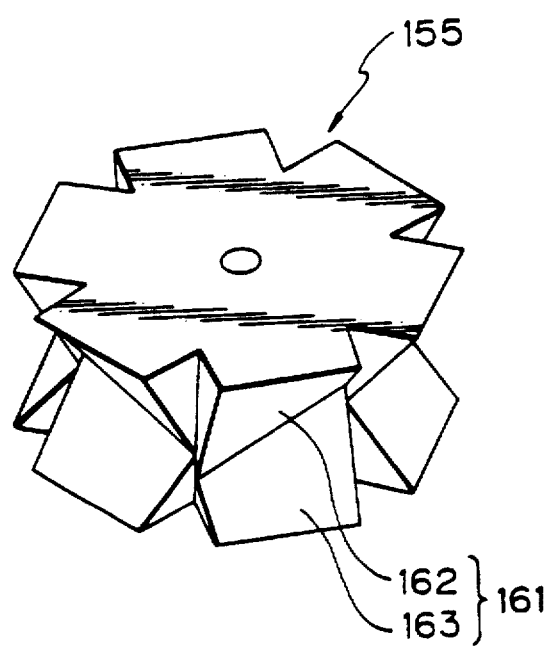
FIG. 10 is a perspective view of the rotary polygon mirror in FIG. 9.

FIG. 10 is a perspective view of the rotary polygonal mirror in FIG. 9. A plurality (in this case, 6) of reflection portions 161 are provided on the rotary polygon mirror 155 and two reflecting planes 162, 163 are provided for each of the reflecting portions 161.

FIG. 11(A) and 11(B) illustrate a front view of the reflecting portion in FIG. 10 and a side view in FIG. 11(A), respectively.

In FIG. 11(A), when a boundary between a reflecting plane 162 and a reflecting plane 163 forms an angle $\theta 1$ with a rectilinear line 164 (a rotary axis of the rotary polygon mirror 155), the polygonal mirror is formed such that the values of θ1 are different for each reflecting plane.

In FIG. 11(B) which is a side view of FIG. 11(A), when the reflecting plane 162 forms an angle θ2 with the reflecting plane 163, the value of θ2 is also different for each reflecting portion 161.

In FIG. 9, a transit direction of a laser beam emitted from a light source 153 is changed by a small mirror 154 to be directed to the rotary polygon mirror 155, whereby the laser beam is reflected from the reflecting plates 162 and 163 of the reflecting portion 161 and then scanned onto the bar code 157 of the article 158 through the reading window 152.

When the angle θ1 of each reflecting portion 161 in the rotary polygonal mirror 155 is constant and only the angle θ2 changes at each reflecting portion 161, the pattern which the laser beam scans on the bar code 157 is shown in FIG. 12(A). When the angle θ2 is constant and only the angle θ1 changes at each reflecting portion 161, the pattern which the laser beam scans on the bar code 157 is shown in FIG. 12(B). When both of the angles θ1 and θ2 change, a multi-directional scanning pattern is formed as shown in FIG. 12(C).

A light reflected from the bar code 157 is reflected by the rotary polygon mirror 155, collected by the collecting lens 159, and transmitted to the photodetector 160. In the photodetector 160, the laser beam is converted into an electriced signal and is decoded as a bar code signal through an A/D convertor and a demodulator (both not illustrated).

This constitution makes it possible to obtain a multi-directional scanning pattern, using only a rotary polygonal mirror 155. Therefore, the use of a holographic disk and many reflecting mirrors is not necessary resulting in lower cost. When the polygon mirror is made of a molded resin and the reflecting plane is formed by aluminum evaporation, the cost can be further decreased. Since the number of reflections of the laser beam is reduced, a loss of light energy can also be reduced and a low output light source may be utilized.

Figure 13:
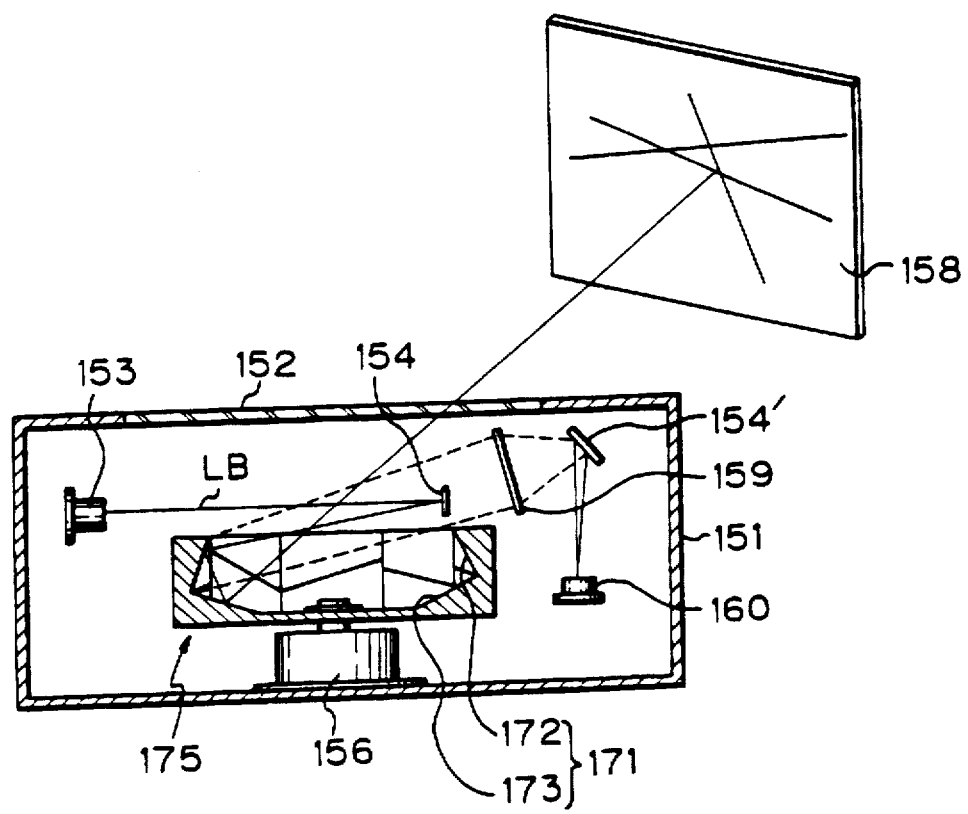

FIG. 13 is a cross-sectional view of another embodiment of the present invention. The shape of the rotary polygon mirror 175 is a quasi-hexagonal cylinder with a skylight. On the inner peripheral plane of the rotary polygon mirror 175, a plurality of reflecting portions 171 (in this case, 6) are provided. Pairs of two reflecting planes 172, 173 are provided for each reflecting portion 171.

In the same way as in FIG. 9, the reflecting planes 172, 173 are formed so that a multi-directional scanning pattern may be obtained for scanning the article 158. The constitution of this embodiment is advantageous in that by using only a rotary polygonal mirror a multi-directional scanning pattern can be produced, and it is not necessary to provide a hologram disk and many reflecting mirrors. Therefore, miniaturization of the device and a large cost reduction is possible.

Figure 14:
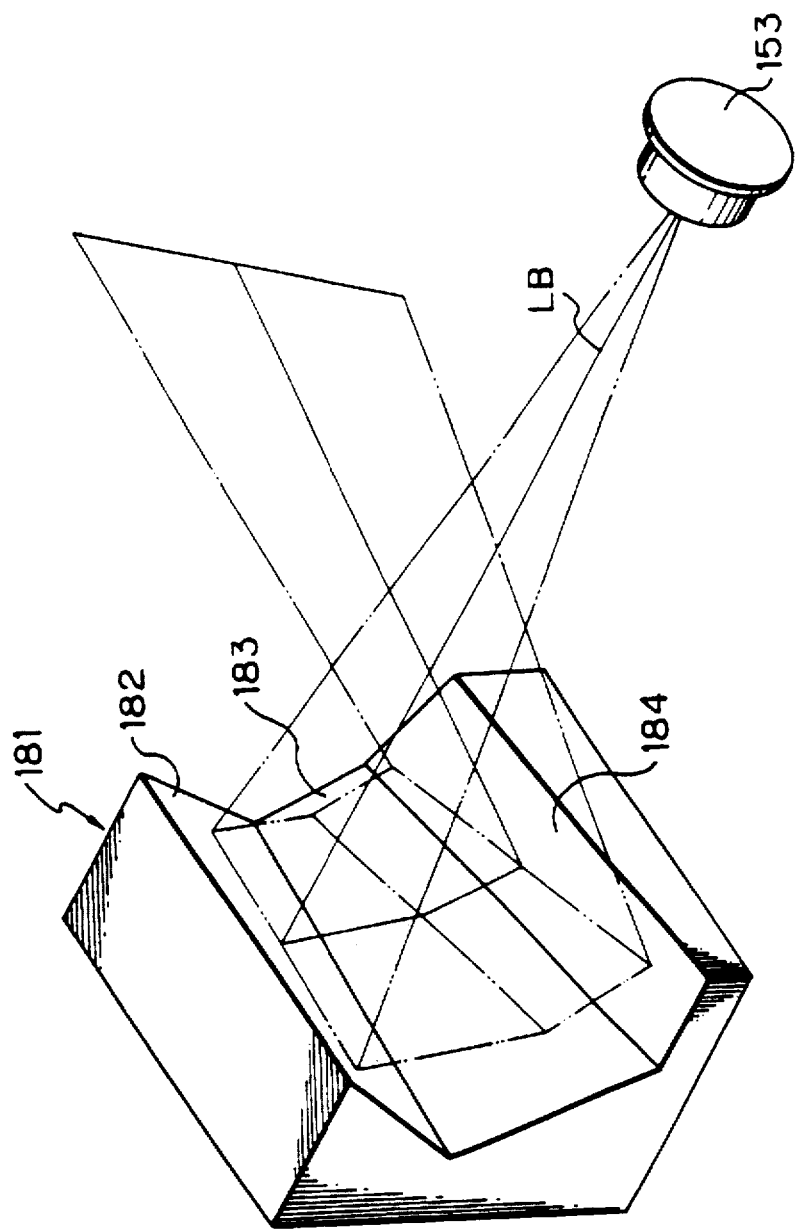
FIG. 14 is a perspective view showing an embodiment of a rotary polygon mirror having three reflecting surfaces.

As shown in FIG. 14, three reflecting planes 182, 183, 184 may be provided for the reflecting portion 181, if necessary.

We claim:

1. A bar code reading device for reading a bar code on an object, comprising:

means for providing a light beam;

means for splitting the light beam into a plurality of light beams;

means for producing scanning beams from the light beams split by said means for splitting the light beam;

windows; and means for detecting a light beam diffused by the coded bars, said means for producing scanning beams including:

a rotary polygonal mirror having a plurality of reflecting portions for reflecting the light beam from said means for providing a light beam; and pattern mirrors for reflecting the light beam reflected by said rotary polygonal mirror, to project a plurality of scanning patterns through said windows respectively onto different portions of an object, each of the scanning patterns including a plurality of intersecting scanning lines.

2. A bar code reading device according to claim 1, wherein said pattern mirrors are divided into pattern mirror groups, each of which includes a plurality of said pattern mirrors, and wherein each of said pattern mirror groups produces a scanning pattern to be projected through one of said windows onto different portions of an object.

3. A bar code reading device according to claim 1, wherein said means for producing scanning beams produces the scanning patterns one at a time.

4. A bar code reading device for reading a bar code on an object, comprising:

a light source for providing a light beam;

optical splitting means for splitting the light beam into a plurality of light beams, each of the light beams split by said optical splitting means being projected in a different direction;

scanning means for producing scanning beams from each of the light beams, said scanning means reflecting said scanning beams in different directions;

pattern mirrors for reflecting the scanning beams from said scanning means and for projecting a scanning pattern including a plurality of intersecting scan lines, each of said pattern mirrors corresponding to and positioned adjacent to a corresponding one of the scanning beams; and windows, each for projecting a scanning pattern reflected from a corresponding one of said pattern mirrors, each of said windows corresponding to one of said pattern mirrors, said windows positioned so that the scanning patterns projected from the respective pattern mirrors are irradiated through said windows onto different portions of an object.

5. A bar code reading device for reading a bar code on an object, comprising:

scanning means for reflecting in different directions a plurality of light beams irradiated from a plurality of directions to produce a scanning beam from each of the light beams;

at least one first window arranged in a first direction;

at least one first pattern mirror positioned adjacent said first window and formed by a plurality of mirrors, for reflecting one of the scanning beams from said scanning means and irradiating the scanning beam through said first window to form a scanning pattern including a plurality of intersecting scan lines;

at least one second window arranged in a second direction substantially perpendicular to said first direction; and at least one second pattern mirror positioned adjacent said second window and formed by a plurality of mirrors, for reflecting one of the scanning beams from said scanning means and irradiating the scanning beam through said second window to form a scanning pattern including a plurality of intersecting scan lines.

6. A multi-directional bar code reading device coupled to a beam source, comprising:

scanning means for reflecting and scanning a beam emitted by the beam source to produce scanning beams, said scanning means including a rotating polygonal mirror; and first and second windows from which the scanning beams produced by said scanning means are respectively projected;

said first window and said second window being disposed so as to be approximately perpendicular to one another, the scanning beam projected from said first window and the scanning beam projected from said second window being projected onto different portions of an object carrying a bar code.

7. A multi-directional bar code reading device coupled to a beam source, comprising:

a first window;

a second window approximately perpendicular to said first window;

a polygonal mirror which reflects a beam emitted from the beam source and projects first and second scanning beams;

first reflection means for reflecting the first scanning beam from said polygonal mirror and projecting the first scanning beam onto an object carrying a bar code; and second reflection means for reflecting the second scanning beam from said polygonal mirror and projecting the second scanning beam from said second window onto an object carrying a bar code, said polygonal mirror being positioned between said first reflection means and said second reflection means.

8. A multi-directional bar code reading device according to claim 7, wherein said polygonal mirror has an axis of rotation which is inclined with respect to each of said first and second windows.

9. A multi-directional bar code reading device according to claim 8, wherein the beam source includes a first beam source, which projects a beam in a first direction, and a second beam source, which projects a beam in a second direction which is perpendicular to the first direction.

10. A multi-directional bar code reading device coupled to a beam source, comprising:

first and second windows;

a polygonal mirror for reflecting a beam emitted from the beam source to generate first and second scanning beams in first and second directions, respectively;

a first pattern mirror for reflecting the first scanning beam from said polygonal mirror to produce a first scanning pattern and projecting the first scanning pattern from said first window onto an object carrying a bar code;

a second pattern mirror for reflecting the second scanning beam from said polygonal mirror to produce a second scanning pattern and projecting the second scanning pattern from said second window onto an object carrying a bar code; and detection means for detecting a beam which is reflected from the object, the reflected beam corresponding to the first scanning pattern projected from said first window entering said reading device from said first window, the reflected beam from the second scanning pattern projected from said second window entering said reading device from said second window, wherein said detection means includes a first detection means for detecting the reflected beam incident through said first window, and a second detection means for detecting the reflected beam incident through said second window.

11. A multi-directional bar code reading device according to claim 10, further comprising:

first light converging means for converging the reflected beam incident through said first window in said first detection means; and second light converging means for converging the reflected beam incident through said second window in said second detection means.

12. A multi-directional bar code reading device coupled to a beam source, comprising:

means for generating first and second scanning beams in first and second directions from first and second light beams, respectively, a first pattern mirror which reflects the first scanning beam to produce a first multi-directional scanning pattern;

a first window for projecting the first multi-directional scanning pattern in a first direction;

a second pattern mirror which reflects the second scanning beam to produce a second multi-directional scanning pattern; and a second window for projecting the second scanning pattern in a second direction, the first and second multi-directional scanning patterns striking different portions of an object carrying a bar code, and the first and second multi-directional scanning patterns being projected alternately, with said first and second windows being at right angles to one another, and the two scanning beams being associated with a common scanning mirror.

13. A multi-directional bar code reading device, comprising:

means for generating first and second scanning beams in first and second directions from first and second light beams, respectively;

a first pattern mirror which reflects the first scanning beam to produce a first multi-directional scanning pattern;

a first window for projecting the first multi-directional scanning pattern in a first direction;

a second pattern mirror which reflects the second scanning beam to produce a second multi-directional scanning pattern; and a second window for projecting the second scanning pattern in a second direction, the first and second multi-directional scanning patterns striking different portions of an object carrying a bar code, and the first and second multi-directional scanning patterns being projected alternately, wherein said generating means is a polygonal mirror having a reflective surface which reflects the beam and a nonreflective surface which does not reflect the beam.

14. A multi-directional bar code reading device coupled to a beam source, comprising:

means for generating first and second scanning beams in first and second directions from a beam emitted by the beam source;

a first pattern mirror which reflects the first scanning beam to produce a first scanning pattern;

a first window for projecting the first scanning pattern in a first direction;

a second pattern mirror which reflects the second scanning beam to produce a second scanning pattern; and a second window for protecting the second scanning pattern in a second direction, the first and second scanning patterns striking different portions of an object carrying a bar code, and the first and second scanning patterns being projected alternately, wherein said generating means is a polygonal mirror having a reflective surface which reflects the beam and a non-reflective surface which does not reflect the beam, and wherein said polygonal mirror receives first and second beams from different directions from the beam source, and wherein said polygonal mirror alternately reflects the first beam and the second beam.

15. A multi-directional bar code reading device according to claim 14, further comprising control means for turning the beam source on and off to produce the first and second beams alternately.

16. A multi-directional bar code reading device, comprising:
   first, second, third and fourth beam sources for producing first, second, third and fourth beams;
   a polygonal mirror having a plurality of reflective surfaces for reflecting said first, second, third and fourth beams to generate scanning beams;
   first, second, third and fourth reflection means for reflecting the scanning beams corresponding to the first, second, third and fourth beams, respectively;
   a first window which projects the reflected scanning beam corresponding to the first beam and which receives a corresponding beam reflected from an object;
   a second window which projects the reflected scanning beam corresponding to the second beam and which receives a corresponding beam reflected from the object;
   a third window which projects the reflected scanning beam corresponding to the third beam and which receives a corresponding beam reflected from the object; and
   a fourth window which projects the reflected scanning beam corresponding to the fourth beam and which receives a corresponding beam reflected from the object, the scanning beams projected from said first, second, third and fourth windows striking different portions of an object carrying a bar code.

17. A multi-directional bar code reading device according to claim 16, wherein the first beam source, said first reflection means and said first window form a first unit, the second beam source, said second reflection means and said second window form a second unit, the third beam source, said third reflection means and said third window form a third unit, and the fourth beam source, said fourth reflection means and said fourth window form a fourth unit, and wherein said first, second, third and fourth units are positioned symmetrically with respect to one another about said polygonal mirror.

18. A bar code reading device for reading a bar code on an object with a light beam, comprising:
   a rotary polygonal mirror for reflecting a plurality of light beams and producing a plurality of scanning beams, said plurality of light beams being projected onto said polygonal mirror from different directions, the scanning beams being respectively related to the light beams;
   a plurality of windows; and
   a plurality of pattern mirrors positioned to reflect the plurality of scanning beams and to project a plurality of scanning patterns through said windows onto different portions of an object.

19. A bar code reading device according to claim 18, wherein each of the scanning patterns is the same.

20. A bar code reading device according to claim 18, wherein said pattern mirrors are divided into groups, with each of said scanning beams being projected onto a corresponding one of the groups of pattern mirrors.

21. A multi-directional code reading device, comprising:
   a plurality of windows;
   a polygonal mirror for reflecting a plurality of incident beams which are incident on said polygonal mirror from different directions, to generate a plurality of scanning beams, wherein each of the scanning beams is related to each of the incident beams, respectively;
   a plurality of pattern mirror sets respectively corresponding to said scanning beams from said polygonal mirror and said windows, each pattern mirror set producing a scanning pattern and projecting from the window corresponding to the pattern mirror set onto an article carrying a code, wherein said pattern mirrors project a scanning pattern that is composed of a plurality of scanning lines which are scanned in four different directions; and
   a detector positioned to detect a beam which is reflected from the article.

22. A device for reading a code on an object, comprising:
   a rotary polygonal mirror for reflecting a plurality of light beams and producing a plurality of scanning beams, said plurality of light beams being projected onto said polygonal mirror from different directions, the scanning beams being respectively related to each of the light beams;
   a plurality of windows; and
   a plurality of pattern mirrors positioned to reflect the plurality of scanning beams and to project a plurality of scanning patterns through said windows onto different portions of an object.

23. A bar code reading device for reading a bar code on an object, said device comprising:
   a light source to emit a light beam;
   a optical system to receive the emitted light beam and to provide a first light beam and a second light beam;
   a single rotary polygonal mirror having a plurality of mirror planes, to scan the first light beam, which is emitted towards the rotary polygonal mirror, from a first direction to produce a first scanning beam, and to scan the second light beam, which is emitted towards the rotary polygonal mirror, from a second direction to the rotary polygonal mirror to produce a second scanning beam;
   a first group of mirrors which includes a plurality of reflecting mirrors, and which reflect the first scanning beam to form a first scan pattern including a plurality of intersecting scan lines;
   a second group of mirrors which includes a plurality of reflecting mirrors, and which reflect the second scanning beam to produce a second scan pattern including a plurality of intersecting scan lines;
   a first window placed in a horizontal direction; and
   a second window placed in a vertical direction;
   wherein scan lines forming the first scan pattern and the second scan pattern are projected from the first window and second window, respectively; and
   wherein the scan lines projected from the first window are projected in an upward direction, and the scan lines projected from the second window are projected in a horizontal direction.

24. A bar code reading device for reading a bar code on an object, said device comprising:
   a light source to emit a light beam;
   an optical system, to receive the emitted light beam, and to provide a plurality of light beams;

a single rotary polygonal mirror having a plurality of mirror planes, to scan the light beam to produce a plurality of scanning beams;

a group of mirrors disposed to surround the rotary polygonal mirror, and including a plurality of reflecting mirrors, the group of mirrors reflecting the scanning beams to form a plurality of scan patterns each comprising a plurality of intersecting scan lines;

a first window placed in a horizontal direction, the scan lines forming the scan pattern being projected therethrough; and a second window placed in a vertical direction, the scan lines forming the scan pattern being projected therethrough;

wherein scan lines projected from the first window are projected in an upward direction, and scan lines projected from the second window are projected in a horizontal direction.

25. A multi-directional bar code reading device comprising:

a single rotary polygonal mirror having a plurality of mirror planes to produce scanning beams by reflecting and scanning an incident beam;

a plurality of pattern mirrors, each pattern mirror including a plurality of mirrors, to produce scanning patterns;

a first window through which a first scanning pattern, including a plurality of intersecting scan lines, is projected to a first direction; and a second window, disposed so as to be approximately perpendicular to the first window, through which a second scanning pattern, including a plurality of intersecting scan lines, is projected in a second direction, the second direction being approximately perpendicular to the first direction.

26. A multi-directional bar code reading device comprising:

a single rotary polygonal mirror having a plurality of mirror planes to produce scanning beams by reflecting and scanning an incident beam;

a plurality of pattern mirrors; and a first window and second window disposed so as to be approximately perpendicular to each other;

wherein said pattern mirrors reflect the scanning beams and produce a plurality of scanning patterns each including a plurality of intersecting scan lines through said first and second windows.

27. A multi-directional bar code reading device comprising:

a single rotary polygonal mirror having a plurality of mirror planes to produce scanning beams by reflecting and scanning incident beams which are projected onto said rotary polygonal mirror from different directions;

a plurality of pattern mirrors; and a first window and a second window disposed so as to be approximately perpendicular to each other;

wherein said pattern mirrors reflect the scanning beams and produce a plurality of scanning patterns each including a plurality of intersecting scan lines through said first and second windows.

* * * * *